United States Patent Office 2,824,868
Patented Feb. 25, 1958

2,824,868

COMPLEX COPPER COMPOUNDS OF DISAZO DYESTUFFS

Ernst Keller, Binningen, and Rudolf Dürig, Basel, Switzerland, assignors to J. R. Geigy A. G., Basel, Switzerland No Drawing. Application September 6, 1955
Serial No. 532,774

Claims priority, application Switzerland
November 17, 1954

6 Claims. (Cl. 260—148)

The present invention is concerned with disazo dyestuffs and the complex copper compounds thereof, the production and use thereof for the dyeing of cellulose material as well as the material fast dyed with the aid of these compounds.

It has been found that the complex copper compound of disazo dyestuffs having the general formula:

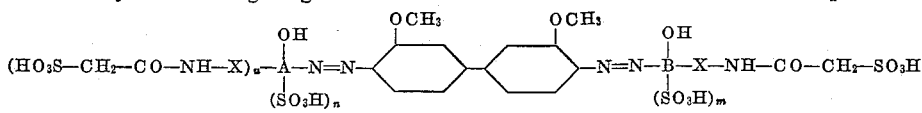

wherein:

A and B each represent a naphthalene radical bound to the azo group in ortho-position to the hydroxyl group,
X represents a member selected from the group consisting of the —NH—Ph—, —NH—CO—Ph— and
—NH—CO—NH—Ph—
radicals, wherein Ph represents a phenylene radical,
$u$ and $m$ are each one of the integers 0 and 1, and
$n$ is one of the integers 1, 2 and 3;

A and B being otherwise free from further sulphacetylamino groups, are suitable for the fast dyeing of cellulose material in blue to blue-grey shades. These dyestuffs are obtained if a tetrazotised 4.4′-diaminodiphenyl compound containing a substituent capable of forming the metal complex in each of the o-positions to the diazo groups is coupled with 2 mols of the same or 1 mol of each of two different hydroxynaphthalene compounds which couple in the o-position to the hydroxyl group, at least one of the hydroxynaphthalene compounds containing the radical —NH—CO—CH$_2$—SO$_3$H bound to the naphthalene ring by way of a bridging member of the formula —NH—Ph—, —NH—CO—Ph, or
—NH—CO—NH—Ph
wherein Ph represents a phenylene radical which can be further substituted if desired.

The disazo dyestuffs so obtained are converted into the complex heavy metal compounds advantageously in substance but also they can be converted on the fibre with agents giving off copper.

4.4′-diamino-3.3′-dimethoxy diphenyl is the preferred tetrazo component.

The following compounds are examples of coupling components which contain the sulphacetylamino group bound to the naphthalene radical by way of a bridging member: 2 - (4′ - sulphacetylaminophenyl - amino) - 5-hydroxynaphthalene - 7 - sulphonic acid, 2 - (3′ - or - 4′-sulphacetylaminobenzoyl - amino) - 5 - hydroxynaphthalene - 7 - sulphonic acid, 2 - (4′ - methyl- or -4′ - chloro- 3′ - sulphacetylaminobenzoyl - amino) - 5 - hydroxynaphthalene - 7 - sulphonic acid, 2 - (3′ - methyl - 4′-sulphacetylaminobenzoyl - amino) - 5 - hydroxynaphthalene - 7 - sulphonic acid, 2 - (3′ - or -4′ - sulphacetylaminobenzoyl - amino) - 8 - hydroxynaphthalene - 6-sulphonic acid, 2- (3′- or 4′ - sulphacetylaminobenzoyl-amino) - 6 - hydroxynaphthalene - 8 - sulphonic acid, 2 - (3′ - methyl - 4′ - sulphacetylaminobenzoyl - amino)-8-hydroxynaphthalene-6-sulphonic acid.

Preferably hydroxynaphthalene sulphonic acids coupling in the neighbouring position to the hydroxyl group not having the critical sulphacetylamino group can be used as further coupling components. These may also contain amino, acylamino or phenylamino groups as further substituents. Examples are: 1-hydroxynaphthalene-3.8- or -4.8-disulphonic acid, 1-hydroxynaphthalene-3.6-disulphonic acid, 1-hydroxynaphthalene-3.6.8-trisulphonic acid, 2 - hydroxynaphthalene - 3.6 - disulphonic acid, 1.7 - dihydroxynaphthalene - 3 - sulphonic acid, 2.8 - dihydroxynaphthalene - 6 - sulphonic acid, 1.8 - dihydroxynaphthalene - 3.6 - disulphonic acid, 1 - acetylamino - 5 - hydroxynaphthalene - 7 - sulphonic acid, 2 - phenylamino-5 - hydroxynaphthalene - 7 - sulphonic acid, 2 - benzoylamino - 8 - hydroxynaphthalene - 6 - sulphonic acid, 2-acetylamino - 8 - hydroxynaphthalene - 6 - sulphonic acid.

The coupling is performed in an alkaline medium: when producing unsymmetrical disazo dyestuffs it is of advantage to couple in steps using that coupling component first which produces an easily soluble monoazodiazo compound, i. e. advantageously a hydroxynaphthalene compound sulphonated at the naphthalene nucleus.

The disazo dyestuffs according to the present invention are metallised preferably in substance by treatment with the usual agents giving off copper in aqueous solution or suspension at a raised temperature, for example with copper salts such as copper sulphate, copper chloride, copper acetate, possibly in the presence of inorganic or organic salts such as sodium chloride, sodium acetate, sodium tartrate or with complex salts such as cupritetramine sulphate. The easily metallisable o.o′-dihydroxy-azo dyestuffs according to the present invention can also be metallised on the fibre by treatment with copper salts. The disazo dyestuffs according to the present invention which are coppered in substance are, however, particularly valuable. They are dark powders which, in the form of their alkali salts, dissolve in hot water with a blue to grey colour according to the composition and they dye cellulose material in very fast corresponding shades.

In contrast to comparable known copper containing disazo dyestuffs which either do not contain the characteristic sulphacetylamino group which is the subject of the present invention or in which this group is replaced by an acetyl or benzoyl group, the new copper containing disazo dyestuffs are distinguished by a better levelling power on cellulose fibres.

The following examples illustrate the invention without limiting it in any way. Where not otherwise stated, parts are given as parts by weight and the temperatures are in degrees centigrade. The relationship of parts by weight to parts by volume is as that of kilogrammes to litres.

*Example 1*

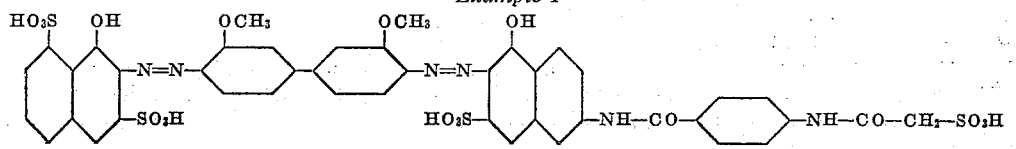

24.4 parts of o-dianisidine are tetrazotised in the usual way and poured at 0–5° into a solution of 30.4 parts of 1-hydroxynaphthalene-3.8-disulphonic acid and 35 parts of sodium carbonate in 1000 parts of water. After a short time the diazomonoazo dyestuff has completely precipitated and no more tetrazonium compound can be traced. A soda alkaline solution of 48.2 parts of 2-(4' - ω - sulphacetylaminobenzoyl - amino) - 5 - hydroxynaphthalene-7-sulphonic acid is then added and the whole is stirred until the coupling is complete. The disazo dyestuff obtained in this manner is precipitated with sodium chloride, filtered off and again dissolved in 2500 parts of water at 80–85°. 400 parts of an ammoniacal copper oxide solution which contains 50 parts of crystalline copper sulphate and 120 parts of concentrated aqueous ammonia are added and the whole is stirred for 4–5 hours at 80–85°. After the addition of a further 50 parts of concentrated ammonia solution, the whole is heated at 90–95° for a further 15–20 hours. The copper complex formed is precipitated with sodium chloride, filtered off and dried. It is a dark powder which dissolves in water with a blue colour and which draws excellently from an aqueous bath on to cotton, linen and regenerated cellulose fibres. The dyeings have very good fastness to light and the shade and fastness to light are barely influenced by anti-crease processing.

Similar dyestuffs are obtained if in this example the 2 - (4' - ω - sulphacetylaminobenzoyl - amino) - 5 - hydroxynaphthalene-7-sulphonic acid is replaced by 2-(3'-ω - sulphacetylaminobenzoyl - amino) - 5 - hydroxynaphthalene-7-sulphonic acid or by 2-(4'-ω-sulphacetylaminophenylcarbamyl - amino) - 5 - hydroxynaphthalene-7-sulphonic acid or by 2 - (4' - ω-sulphacetylaminophenyl-amino)-5-hydroxynapthalene-7-sulphonic acid or by 2 - (3'-ω-sulphacetylaminobenzoyl-amino)-6-hydroxynaphthalene-8-sulphonic acid.

Example 2

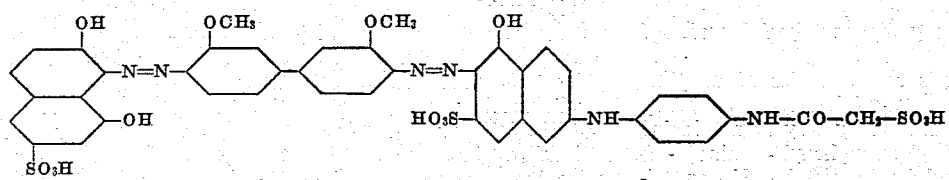

A soda alkaline solution of 45.2 parts of 2-(4'-ω-sulphacetylaminophenyl - amino) - 5 - hydroxynaphthalene-7-sulphonic acid is poured into the intermediate product from 24.4 parts of tetrazotised o-dianisidine and 24.0 parts of 2.8-dihydroxynaphthalene-6-sulphonic acid and the whole is stirred until the coupling is complete. The dyestuff is converted into the copper complex as described in Example 1. The copper containing dyestuff dyes cotton and staple rayon in strong grey-blue shades. The dyeings have very good fastness to light.

If, instead of 2.8-dihydroxynaphthalene-6-sulphonic acid, 1.8-dihydroxynaphthalene-3.6-disulphonic acid or 1-hydroxynaphthalene-4.8-disulphonic acid is used and otherwise the same procedure is followed, then disazo dyestuffs are obtained, which, as copper complexes, dye cellulose material in blue shades which have very good fastness to light.

Similar dyestuffs are obtained also if the 2 - (4' - ω - sulphacetylaminophenyl - amino) - 5 - hydroxynaphthalene-7-sulphonic acid is replaced by 2-(3'-ω-sulphacetylaminobenzoyl - amino) - 5 - hydroxynaphthalene - 7 - sulphonic acid or by 2 - (3'-ω-sulphacetylaminobenzoyl-amino)-8-hydroxynaphthalene-6-sulphonic acid.

Example 3

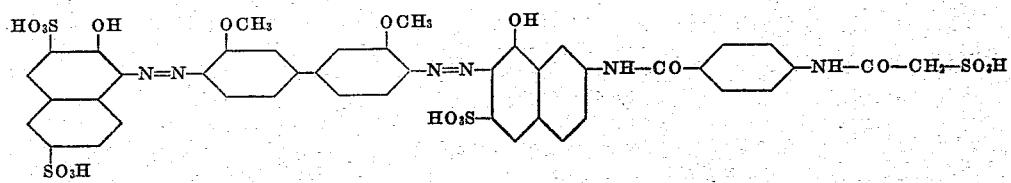

A soda alkaline solution of 48 parts of 2-(4'-ω-sulphacetylaminobenzoyl - amino) - 8 - hydroxynaphthalene-6-sulphonic acid is poured into the intermediate product from 24.4 parts of tetrazotised o-dianisidine and 30.4 parts of 2-hydroxynaphthalene-3.6-disulphonic acid and the whole is stirred until the coupling is complete. The copper complex compound produced therefrom as described in Example 1 dyes cellulose material direct in greyish-blue shades which have very good fastness to light.

If in this example, the 2-(4'-ω-sulphacetylaminobenzoyl - amino) - 8 - hydroxynaphthalene - 6 - sulphonic acid is replaced by 2-(3'-ω-sulphacetylaminobenzoyl-amino)-6-hydroxynaphthalene-8-sulphonic acid or by 2-(4' - ω - sulphacetylaminophenylcarbamyl - amino) - 5 - hydroxynaphthalene-7-sulphonic acid or by 2-(4'-ω-sulphacetylaminobenzoyl - amino) - 5 - hydroxynaphthalene-7-sulphonic acid, then copper containing disazo dyestuffs with similar good properties are obtained.

Similar dyestuffs are also obtained if the 2-hydroxynaphthalene - 3.6 - disulphonic acid is replaced by 1-hydroxynaphthalene-3.6.8-trisulphonic acid.

Example 4

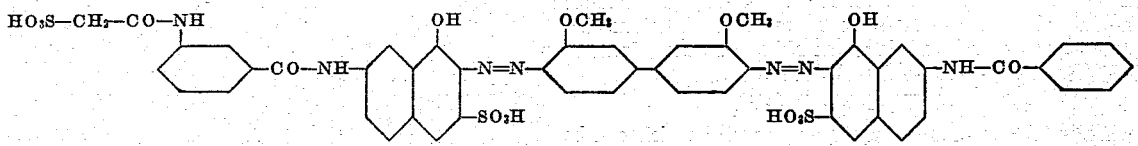

A soda alkaline solution of 34.3 parts of 2-benzoylamino-8-hydroxynaphthalene-6-sulphonic acid is poured into the intermediate product from 24.4 parts of tetrazotised o-dianisidine and 48 parts of 2-(3'-ω-sulphacetylaminobenzoyl - amino) - 8 - hydroxynaphthalene - 6 - sulphonic acid and the whole is stirred until the coupling is complete. The copper complex compound which is obtained according to the method described in Example 1, dyes cotton and staple rayon direct in greyish-blue shades which have very good fastness to light.

Further similar dyestuffs are obtained if, instead of 2 - benzoylamino - 8 - hydroxynaphthalene - 6 - sulphonic acid, 2-benzoylamino - 5 - hydroxynaphthalene-7-sulphonic acid or 1-acetylamino-5-hydroxynaphthalene-7-sulphonic acid is used.

cotton are entered at 40–50°, the bath is warmed within 30 minutes to 90–95°, 30 parts of sodium sulphate are added and dyeing is performed for 45 minutes at this temperature. After this time, the dyed goods are rinsed cold in the usual way and dried. The cotton is dyed

*Example 5*

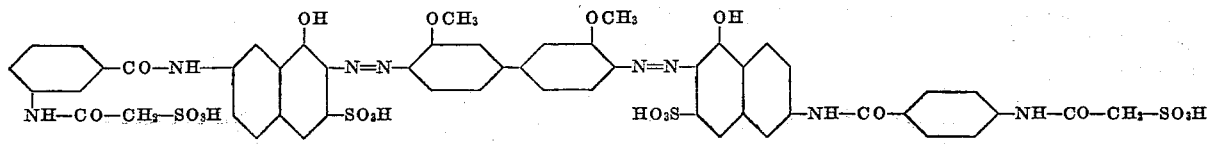

A soda alkaline solution of 48 parts of 2 - (4' - ω - sulphacetylamino-benzoyl - amino) - 5 - hydroxynaphthalene-7-sulphonic acid is poured into the intermediate product from 24.4 parts of tetrazotised o-dianisidine and 48 parts of 2-(3'-ω-sulphacetylaminobenzoyl-amino)-8-hydroxynaphthalene-6-sulphonic acid and the whole is stirred until the coupling is complete. The copper complex compound produced therefrom according to Example 1 dyes cellulose material direct in blue shades which have very good fastness to light.

If in this example the 2-(3'-ω-sulphacetylaminobenzoyl-amino)-8-hydroxynaphthalene-6-sulphonic acid is replaced by 2-(4'-ω-sulphacetylaminobenzoyl-amino)-8-hydroxynaphthalene-6-sulphonic acid or if 2-(4'-ω-sulphacetylaminophenyl-amino) - 5-hydroxynaphthalene-7-sulphonic acid or 2-(3'-ω-sulphacetylaminobenzoyl-amino)-5-hydroxynaphthalene-7-sulphonic acid is used instead of 2-(4'-ω-sulphacetylaminobenzoyl-amino)-5-hydroxynaphthalene-7-sulphonic acid and otherwise the same procedure is followed, then copper containing disazo dyestuffs with similar good properties are obtained.

in vivid blue shades which have good wet fastness and very good light fastness properties.

What we claim is:

1. The copper complex compound of a disazo dyestuff having the general formula:

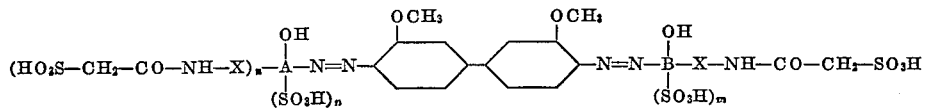

wherein:

A and B each represent a naphthalene radical bound to the azo group in ortho-position to the hydroxyl group, X represents a member selected from the group consisting of the —NH—PH—, —NH—CO—Ph— and —NH—CO—NH—Ph— radicals wherein Ph represents a phenylene radical,
$u$ and $m$ are each one of the integers 0 and 1, and
$n$ is one of the integers 1, 2 and 3, A and B being otherwise free from further sulphacetylamino groups.

2. The complex copper compound of a disazo dyestuff having the formula:

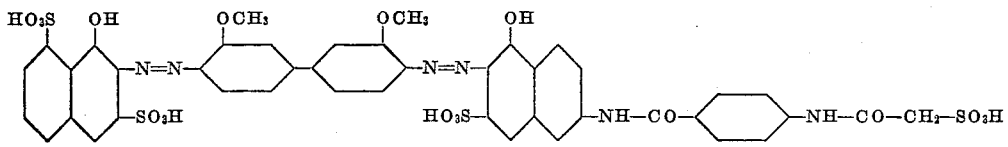

*Example 6*

2 parts of the dyestuff obtained according to Example 1 are dissolved in a dyebath containing 3000 parts of water and 2 parts of sodium carbonate. 100 parts of 3. The complex copper compound of a disazo dyestuff having the formula:

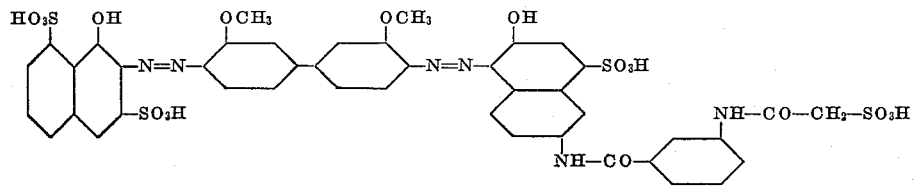

4. The complex copper compound of a disazo dyestuff having the formula:

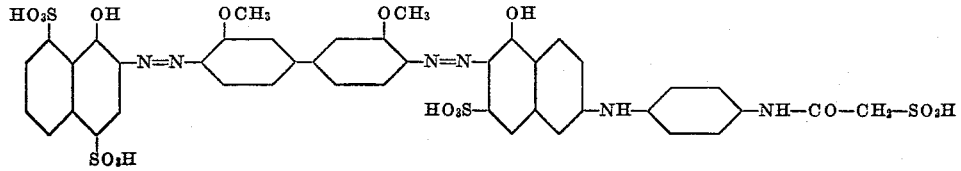

5. The complex copper compound of a disazo dyestuff having the formula:
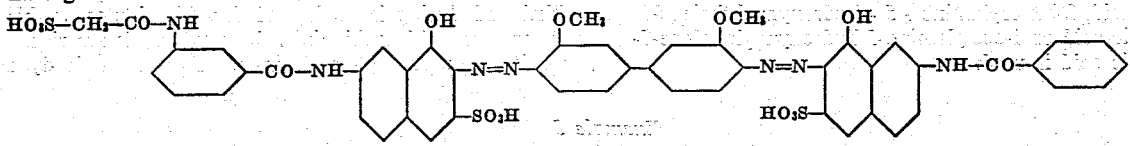
6. The complex copper compound of a disazo dyestuff having the formula:
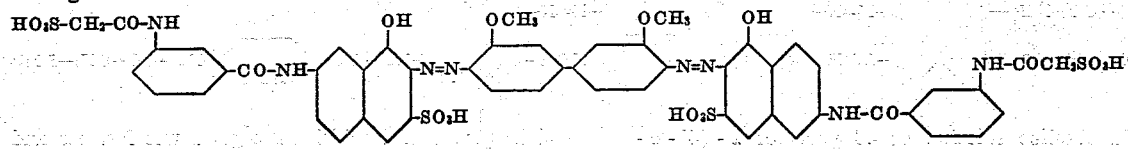
References Cited in the file of this patent
UNITED STATES PATENTS
2,714,588   Keller _____ Aug. 2, 1955